United States Patent [19]
Naito et al.

[11] Patent Number: 5,512,713
[45] Date of Patent: Apr. 30, 1996

[54] LOAD CELL HAVING A HOLLOW AND A STRAIN GAUGE FORMED ON A SUBSTRATE ATTACHED INSIDE THE HOLLOW

[75] Inventors: Kazufumi Naito; Michito Utsunomiya; Hiroyuki Konishi; Shotaro Tamai, all of Shiga, Japan

[73] Assignee: Ishida Co., Ltd., Kyoto, Japan

[21] Appl. No.: 266,210

[22] Filed: Jun. 27, 1994

Related U.S. Application Data

[63] Continuation-in-part of Ser. No. 996,644, Dec. 24, 1992, abandoned.

[30] Foreign Application Priority Data

Dec. 27, 1991 [JP] Japan .................................. 3-360357
Aug. 6, 1992 [JP] Japan .................................. 4-232841

[51] Int. Cl.⁶ .............................. G01G 3/14; G01G 3/08
[52] U.S. Cl. ................. 177/211; 177/229; 73/862.632; 73/862.637
[58] Field of Search ................. 177/211, 229; 73/862.632, 862.637

[56] References Cited

U.S. PATENT DOCUMENTS

| | | |
|---|---|---|
| 3,805,604 | 4/1974 | Ormond . |
| 4,404,059 | 9/1983 | Livshits et al. . |
| 4,475,610 | 10/1984 | Schwarzschild . |
| 4,600,066 | 7/1986 | Griffen et al. .................... 177/211 |
| 4,657,097 | 4/1987 | Griffen . |
| 4,785,673 | 11/1988 | Aumard .......................... 73/862.65 |
| 5,220,971 | 6/1993 | Farr ................................ 177/229 |
| 5,222,398 | 6/1993 | O'Brien ........................ 73/862.632 |

FOREIGN PATENT DOCUMENTS

| | | |
|---|---|---|
| 0227597 | 12/1986 | France . |
| WO9208115 | 5/1992 | WIPO . |

OTHER PUBLICATIONS

Japanase Abstract No. 56–72323, vol. 5, No. 134 (P–77) (806) Aug. 26, 1981.

*Primary Examiner*—Peter S. Wong
*Assistant Examiner*—Randy W. Gibson
*Attorney, Agent, or Firm*—Sughrue, Mion, Zinn, Macpeak & Seas

[57] ABSTRACT

A load cell for use in detecting a load imposed thereon which includes a strain inducing unit (1) having a longitudinal axis and including a strain generating area (6) for generating a strain as a function of the load, and a strain sensor (40) including a substrate (41) having a strain detecting element (43) formed thereon for detecting the strain generated at the strain generating area (6) of the strain inducing unit (1). The strain inducing unit (1) includes a fixed rigid body (2), a movable rigid body (3), first and second beams (4) connecting the fixed rigid body (2) and the movable rigid body (3) together, and an intermediate plate structure (30) fixed to and positioned between the fixed and movable rigid bodies (2 and 3). The intermediate plate structure (30) has a cut space (P) defined therein at a location intermediate between the fixed rigid body (2) and the movable rigid body (3). The strain inducing unit (1) is of a symmetrical profile with respect to a geometric center point (C) of the load cell and having a hollow defined therein and delimited by the fixed rigid body (2), the movable rigid body (3), the first and second beams (4) and the intermediate plate structure (30). The strain sensor (40) is accommodated within the hollow so as to straddle the cut space (P) and positioned substantially in alignment with a mid-center line (OX) extending past the geometric center point (C) and parallel to the longitudinal axis (X) of the strain inducing unit (1).

9 Claims, 9 Drawing Sheets

LOAD CELL HAVING A HOLLOW AND A STRAIN GAUGE FORMED ON A SUBSTRATE ATTACHED INSIDE THE HOLLOW

This is a Continuation-in-Part of application Ser. No. 07/996,644, filed Dec. 24, 1992 now abandoned.

BACKGROUND OF THE INVENTION 1. (Field of the Invention)

The present invention relates generally to a load cell for electrically detecting a load imposed on a strain inducing element of a specific configuration, by the utilization of an electric characteristic of a strain detecting element such as, for example, a strain gauge, mounted on the strain inducing element, and a weighing apparatus such as an electronic scale using the load cell.

2. (Description of the Prior Art)

Figure 12:
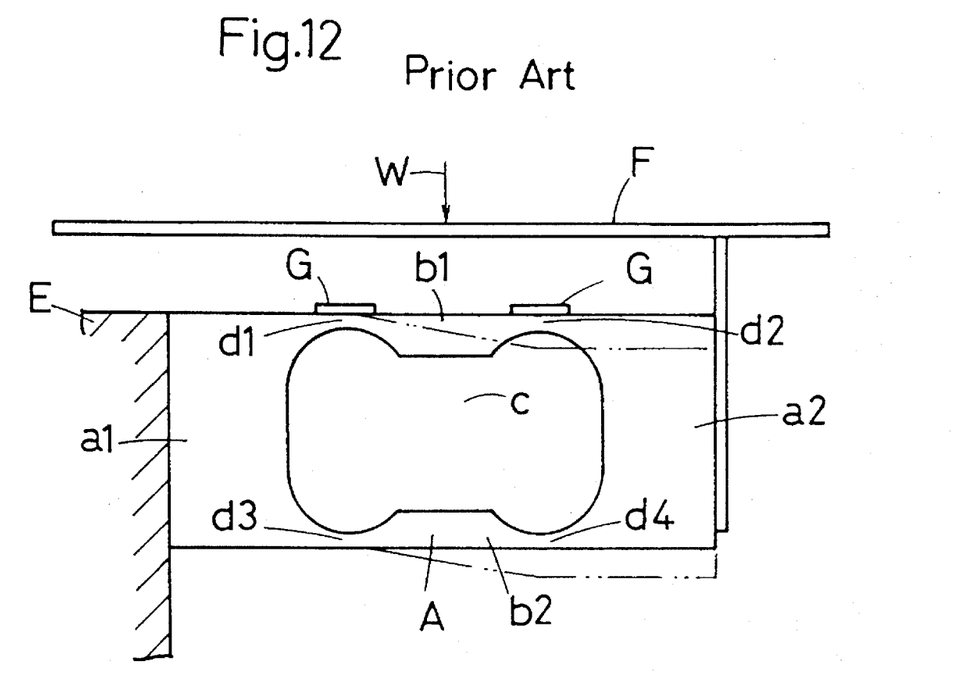
FIG. 12 is a schematic diagram showing the prior art load cell.

The load cell used in an electronic scale generally is employed in the form of a strain inducing element as shown in FIG. 12 and comprises fixed and movable rigid bodies a1 and a2 opposite to each other and a pair of parallel beams b1 and b2 extending between the fixed and movable rigid bodies a1 and a2. All of those elements a1, a2, b1 and b2 are defined by forming a cave c in a generally rectangular cubic metal block so that the fixed and movable rigid bodies a1 and a2 occupy respective opposite end portions of the metal block while the parallel beams b1 and b2 occupy respective opposite side portions of the metal block. The cave c is so shaped and so configured as to leave pairs of thin walled strain generating areas d1 and d2, d3 and d4, the strain generating areas d1 and d2 of one pair being defined at respective junctions of opposite ends of the beam b1 with the fixed and movable rigid bodies a1 and a2 while the strain generating areas d3 and d4 of the other pair are defined at respective junctions of opposite ends of the beam b2 with the fixed and movable rigid bodies a1 and a2.

The prior art strain inducing element A is so designed and so structured that, when a load W is applied to the movable rigid body a2, a considerable deformation occurs at the thin-walled strain generating areas d1 to d4 as shown by the phantom line, causing the movable rigid body a2 to undergo a parallel downward motion relative to the fixed rigid body a1. In other words, the strain generating areas d1 to d4 generate respective strains in a quantity proportional to the applied load W to reduce any possible adverse influence brought about by a bending moment. In practice, the fixed rigid body a1 of the strain inducing element A is rigidly secured to a base E of the electronic scale while the movable rigid body a2 is coupled with a scale table F. Strain detecting elements G such as, for example, strain gauges, are immovably placed on respective surfaces of the strain reducing element A in alignment with at least two of the strain generating areas d1 and d2 (or d3 and d4) so that a tensile strain and a compressive strain induced in the strain generating areas d1 and d2 as a function of the load placed on the scale table F can be detected by the respective strain detecting elements G thereby to provide an indication of the load W.

It has, however, been found that, even with the prior art measuring method discussed above, the strain generating areas d1 to d4 are not completely lessened from the adverse influence brought about by the bending moment of the strain inducing element on the strains induced therein, and it has been well recognized to minimize the adverse influence brought about by the bending moment in order to accomplish a more accurate load measurement.

SUMMARY OF THE INVENTION

Accordingly, a primary object of the present invention is to provide an improved load cell designed to minimize any possible adverse influence which would be brought about by a bending moment of the strain inducing element on the measurement of strain accomplished by such load cell.

It is also a related object of the present invention to provide a weighing apparatus using the load cell of the type referred to above.

To this end, the present invention provides a load cell for use in detecting a load imposed thereon which comprises a strain inducing means having a longitudinal axis and including a strain generating area for generating a strain as a function of the load, and a strain sensor including a substrate having a strain detecting element formed thereon for detecting the strain generated at the strain generating area of the strain inducing means. The strain inducing means comprises a fixed rigid body adapted to be connected to a base, a movable rigid body spaced apart from the fixed rigid body in a direction parallel to the longitudinal axis of the strain inducing means and adapted to receive the load, first and second beams spaced apart from each other in a direction perpendicular to the longitudinal axis of the strain inducing means and connecting the fixed and movable rigid bodies together, and an intermediate plate structure fixed to the fixed and movable rigid bodies and positioned intermediate between the first and second beams. The intermediate plate structure has a cut space defined therein at a location intermediate between the fixed and movable rigid bodies. The strain inducing means is of a symmetrical profile with respect to a geometric center point of the load cell and having a hollow defined therein and delimited by the fixed and movable rigid bodies, the first and second beams and the intermediate plate structure. With the strain inducing means so constructed, the strain sensor is accommodated within the hollow so as to straddle the cut space and positioned substantially in alignment with a mid-center line extending past the geometric center point and parallel to the longitudinal axis of the strain inducing means.

A weighing apparatus herein provided in accordance with the present invention makes use of the load cell of the type referred to above as a means for detecting a load imposed on a weighing table.

According to the present invention, since the strain inducing means is of a design in which the strain generating area is defined at the first and second beams and, on the other hand, the movable rigid body can undergo a downward parallel motion relative to the fixed rigid body in response to the load applied to the movable rigid body and since the strain inducing means is also of a design symmetrical with respect to the geometric center point lying in a mid-center line parallel to the lengthwise direction of the strain inducing means, the strain inducting means as a whole constitutes a Roberval's parallel motion mechanism. Therefore, not only can the quantity of strain detected by the strain sensor be proportional to the applied load, but also it will hardly be adversely affected by the bending moment acting in the strain inducing means when the load is applied.

Also, since the strain sensor is disposed in alignment with the mid-center line parallel to the lengthwise direction of the strain inducing means and is positioned at a location substantially intermediate of the height of the strain inducing means, the extent to which the strain sensor may be adversely affected by the bending moment acting in the strain inducing means can further be advantageously minimized, resulting in an increase in load detecting accuracy. It is to be noted that, since the substrate forming a part of the strain sensor is not a structural element for supporting the applied load, it is possible to employ it in the form of a thin plate member and, also, the substrate of the strain sensor can be positioned as close to the mid-center line as possible.

According to one aspect of the present invention, the intermediate plate structure may comprise a first intermediate plate member secured rigidly to the fixed rigid body and a second intermediate plate member secured rigidly to the movable rigid body. In this case, the cut space in the intermediate plate structure is a gap formed between the first and second intermediate plate members.

Alternatively, the intermediate plate structure may comprise a single intermediate plate member, and in such case, the cut space in the intermediate plate structure is an opening defined in the intermediate plate member at a location intermediate of the length of the intermediate plate member.

Preferably, the substrate of the strain sensor is in the form of a thin plate having the strain generating area defined therein for facilitating stress build-up and wherein the strain detecting element is positioned at the strain generating area. With this design, a relatively great amount of strain can be caused to be induced in the strain detecting element of the strain sensor and, therefore, the load detecting accuracy can be increased advantageously.

Both of the strain inducing means and the substrate of the strain sensor may be made of metallic material. In such case, the substrate of the strain sensor can be welded at its opposite ends to the strain inducing means and, therefore, the mounting of the strain sensor in the strain inducing means can readily be accomplished.

Preferably, the substrate of the strain sensor has opposite portions clear from a region where the strain detecting element is formed, in order to allow the substrate to be supported by the strain inducing means with the portions thereof welded thereto. This is particularly advantageous in that the strain detecting element will not be adversely affected by and undesirably deformed by the elevated temperature in the presence of a welding heat generated during the welding job.

Also preferably, the strain inducing means and the substrate of the strain sensor are made of identical metallic material. In such case, the substrate of the strain sensor can exhibit the same coefficient of thermal expansion as that exhibited by the strain inducing means and, therefore, any possible change in amount of strain detected by the strain detecting element which would occur as a result of a change in ambient temperature regardless of the load-induced strain can be minimized or substantially eliminated, with the strain sensor consequently exhibiting a favorable temperature dependent characteristic.

According to a further aspect of the present invention, the strain inducing means comprises generally elongated first and second structures with the first structure positioned above the second structure so as to represent the symmetrical profile with respect to the geometric center point, the intermediate plate structure being sandwiched between the first and second structures. In this aspect of the present invention, the first structure includes an upper half of the fixed rigid body, an upper half of the movable rigid body and the first beam while the second structure includes a lower half of the fixed rigid body, a lower half of the movable rigid body and the second beam. With this design, the strain inducing means can readily be assembled by connecting the first and second structures together while the intermediate structure is sandwiched therebetween. Accordingly, this design makes it possible to dispense with the use of any die casting and a subsequent machining both employed in the practice of the prior art to form the strain inducing unit, thereby simplifying the process of making the strain inducing means.

Preferably, each of the first and second structures and the intermediate plate structure is formed by the use of a metal plate to facilitate the productivity.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENTS

Figure 1:
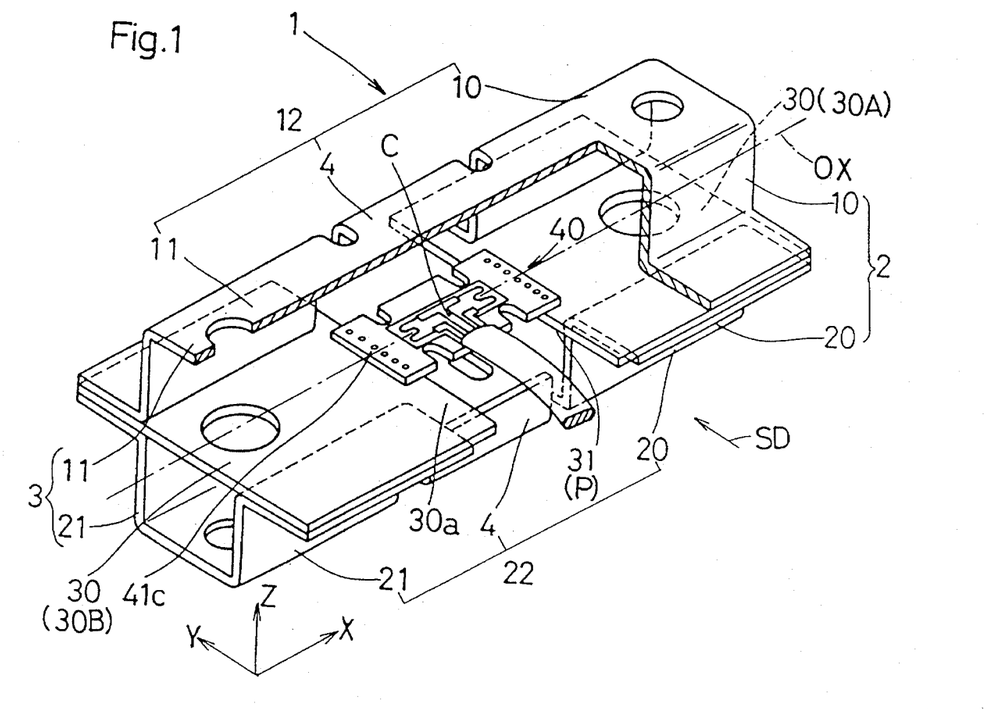
FIG. 1 is a schematic perspective view, with a portion cut away, showing a load cell according to a first preferred embodiment of the present invention.

Referring first to FIG. 1, a strain inducing unit 1 used in a load cell according to the present invention is of a generally elongated configuration having a longitudinal axis lying in a direction shown by the arrow Y. This strain inducing unit 1 has fixed and movable rigid bodies 2 and 3 occupying respective opposite ends of the strain inducing unit 1 which are spaced apart from each other in a longitudinal direction X thereof. This strain inducing unit 1 comprises generally elongated upper (first) and lower (second)

plate structures 12 and 22 of substantially identical construction with the upper plate structure 12 positioned above the lower plate structure 22 so as to define a generally rectangular-sectioned hollow therebetween, said upper and lower plate structures 12 and 14 including respective upper and lower beams 4 which extend parallel to each other between the fixed and movable rigid bodies 2 and 3; an intermediate plate structure 30 sandwiched between the upper and lower plate structures 12 and 22; and a strain sensor 40 positioned within the rectangular-sectioned hollow and supported between the first and second intermediate plate members 30A and 30B so as to bridge therebetween.

In this construction, the generally rectangular-sectioned hollow so defined between the upper and lower plate structures 12 and 22 is symmetrical in configuration with respect to a geometric center point C thereof and is, with the intermediate plate structure 30 intervening between the upper and lower plate structures 12 and 22, divided into upper and lower cavities of an identical and symmetrical shape; the upper cavity being defined between the upper plate structure 12 and the intermediate plate structure 30 and the lower cavity being defined between the lower plate structure 22 and the intermediate plate structure 30.

The intermediate plate structure 30 has a cutout P defined therein and containing the geometric center point C. In the illustrated embodiment, this intermediate plate structure 30 is separated into generally square first and second intermediate plate members 30A and 30B with a gap 31 defined therebetween, said gap 31 constituting the cutout P.

The upper plate structure 12 is of one-piece construction including a pair of rigid body forming regions 10 and 11 opposite to each other and connected together by means of an upper beam 4, said rigid body forming areas 10 and 11 constituting respective upper portions of the fixed and movable rigid bodies 2 and 3. Similarly, the lower plate structure 22 is of one-piece construction including a pair of rigid body forming regions 20 and 21 opposite to each other and connected together by means of a lower beam 4, said rigid body forming regions 20 and 21 constituting respective lower portions of the fixed and movable rigid bodies 2 and 3, respectively. It is to be noted that the strain inducing unit 1 having the rectangular-sectioned hollow defined between the upper and lower plate structures 12 and 22 is symmetric with respect to the geometric center point C thereof. Thus, the strain inducing unit 1 represents a three-layered structure in which the intermediate plate members 30A and 30B intervene between the upper and lower structures 12 and 22 while the strain sensor 40 is positioned substantially intermediate of the height of the strain inducing unit 1 (as measured in a direction conforming to a vertical axis Z perpendicular to the longitudinal axis X) and in alignment with the mid-center line OX parallel to the longitudinal axis X and passing across the geometric center point C.

Figure 2:
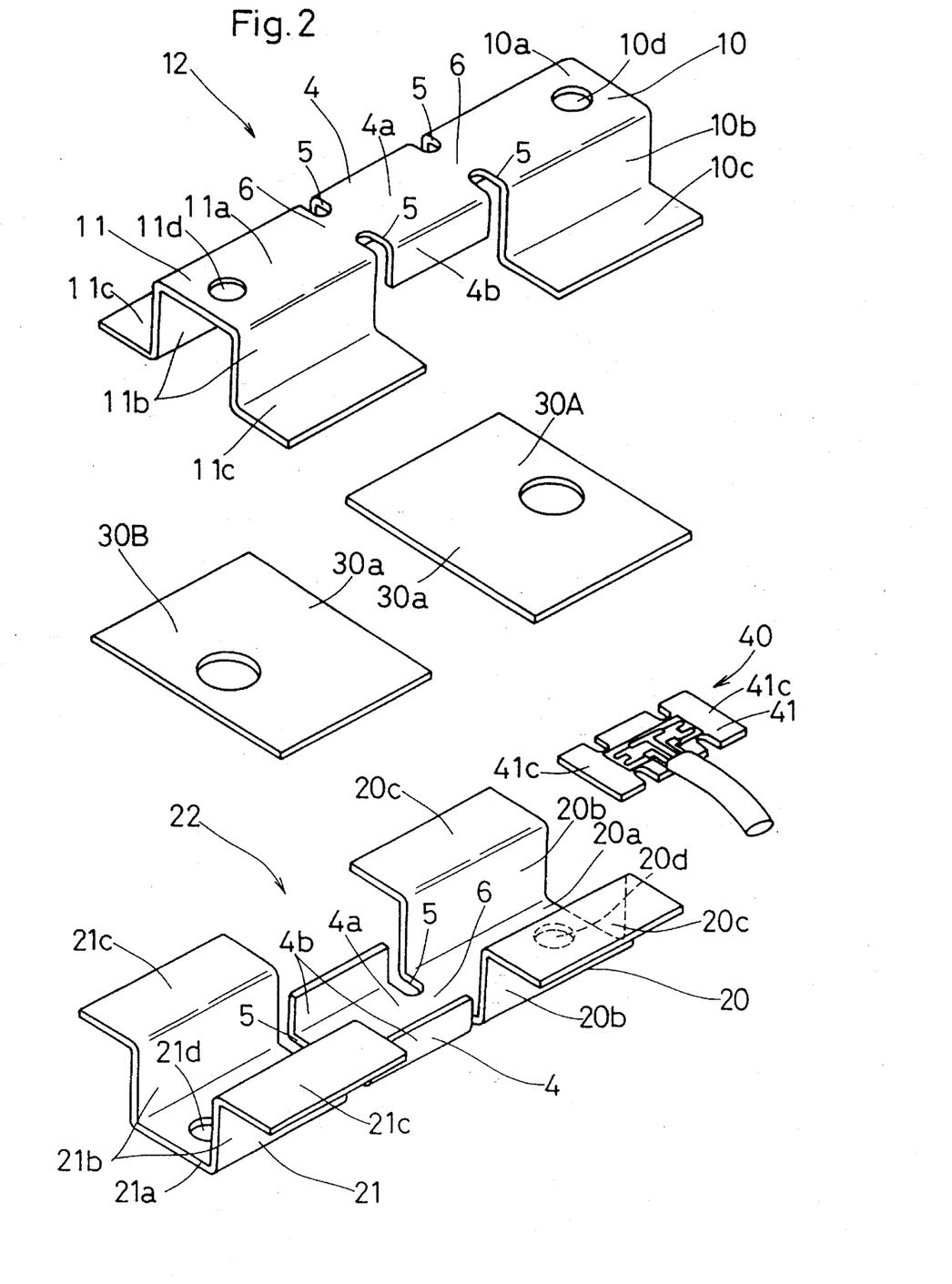
FIG. 2 is an exploded view of the load cell shown in FIG. 1.

The details of various component parts of the strain inducing unit 1 according to the present invention will now be described with particular reference to FIG. 2 showing an exploded view of the strain inducing unit 1.

The upper plate structure 12 has its opposite end portions constituting the respective rigid body forming regions 10 and 11. Each of the opposite end portions, that is, the rigid body forming regions 10 and 11, of the upper plate structure 12 is constituted by a top wall 10a or 11a, a pair of opposite side walls 10b or 11b substantially perpendicular to the top wall 10a or 11a, and a pair of flanges 10c or 11c protruding laterally outwardly from the associated side walls 10b or 11b and lying in a plane parallel to the top wall 10a or 11a. The top walls 10a and 11a of the respective rigid body forming regions 10 and 11 are connected together by means of the upper beam 4 which is constituted by a top wall 4a flush with any one of the top walls 10a and 11b and a pair of opposite side walls 4b normal to the top wall 4a. This upper plate structure 12 has two pairs of notches, generally identified by 5, each pair positioned on one side thereof with respect to the longitudinal axis of the upper plate structure 12 so as to define two constricted regions 6 of reduced width between the top walls 10a and 4a and between the top walls 11a and 4a.

It is to be noted that the upper plate structure 12 of the above described construction is symmetric in shape with respect to a vertical plane including both the longitudinal axis X and the vertical axis Z and also with respect to a vertical plane including an axis Y passing across the geometric center point C while extending perpendicular to both of the longitudinal and vertical axes X and Z, and that each of the constricted regions 6 has a reduced rigidity as compared with the remaining portion of the upper plate structure 12 and does therefore define a strain inducing area where stresses are easy to build up. It is also to be noted that each of the respective top walls 10a and 11a of the rigid body forming regions 10 and 11 has a bolt hole 10d or 11d defined therein for the passage therethrough of a respective fitting bolt (not shown).

Similarly, the lower plate structure 22 has its opposite end portions constituting the respective rigid body forming regions 20 and 21. Each of the opposite end portions, that is, the rigid body forming regions 20 and 21, of the lower plate structure 22 is constituted by a bottom wall 20a or 21a, a pair of opposite side walls 20b or 21b substantially perpendicular to the bottom wall 20a or 21a, and a pair of flanges 20c or 21c protruding laterally outwardly from the associated side walls 20b or 21b and lying in a plane parallel to the bottom wall 20a or 21a. The bottom walls 20a and 21a of the respective rigid body forming regions 20 and 21 are connected together by means of the lower beam 4 which is constituted by a bottom wall 4a flush with any one of the bottom walls 20a and 21b and a pair of opposite side walls 4b normal to the bottom wall 4a. This lower plate structure 22 has two pairs of notches, generally identified by 5, each pair positioned on one side thereof with respect to the longitudinal axis of the lower plate structure 22 so as to define two constricted regions 6 of reduced width between the bottom walls 20a and 4a and between the bottom walls 21a and 4a.

It is to be noted that the lower plate structure 22 of the above described construction is of a construction substantially identical with the upper plate structure 12 and is symmetric in shape with respect to the vertical plane including both the longitudinal axis X and the vertical axis Z and also with respect to a vertical plane including the axis Y passing across the geometric center point C while extending perpendicular to both of the longitudinal and vertical axes X and Z, and that each of the constricted regions 6 has a reduced rigidity as compared with the remaining portion of the lower plate structure 22 and does therefore define a strain inducing area where stresses are easy to built up. It is also to be noted that each of the respective bottom walls 20a and 21a of the rigid body forming regions 20 and 21 has a bolt hole 20d or 21d defined therein for the passage therethrough of a respective set bolt (not shown).

Each of the first and second intermediate plate members 30A and 30B forming the intermediate plate structure 30 is in the form of a generally square thin plate and has one side edge portion 30a defining a mount for the fitting of the strain sensor 40. To complete the strain inducing unit 1, the first and second intermediate plate members 30A and 30B are sandwiched between the upper and lower plate structures 12 and 22 with the flanges 10c and 11c of the upper plate structure 12 welded together with the associated flanges 20c and 21c of the lower plate structure 22. At this time, opposite side edge portions of each of the first and second intermediate plate members 30A and 30B on respective side of the mount 30a are sandwiched between the flanges 10c and 11c of the upper plate structure 12 and the flanges 20c and 21c of the lower plate structure 12 and welded thereto. For welding the upper and lower plate structures 12 and 22 together with the first and second intermediate plate members 30A and 30B intervening therebetween, any suitable welding method may be employed such as, for example, a spot welding technique. It is to be noted that prior to the welding being effected to the flanges 10c, 11c and 20c, 21c of the upper and lower plate structures 12 and 22, the strain sensor 40 is secured at its opposite ends to the respective mounts 30a of the first and second intermediate plate members 30A and 30B so as to bridge between the first and second intermediate plate members 30A and 30B.

The strain inducing unit 1 of the construction described above is so designed and so structured as to constitute a Roberval's parallel motion mechanism as is the case with that shown in FIG. 12. In other words, the strain inducing unit 1 is so designed and so structured that, when a load is imposed on the movable rigid body 3, the strain inducing unit 1 undergoes a considerable bending about the four constricted or strain inducing areas 6 in the upper and lower plate structures 12 and 22 while the movable rigid body 3 moving downwardly and generally parallel relative to the fixed rigid body 2.

Figure 3:
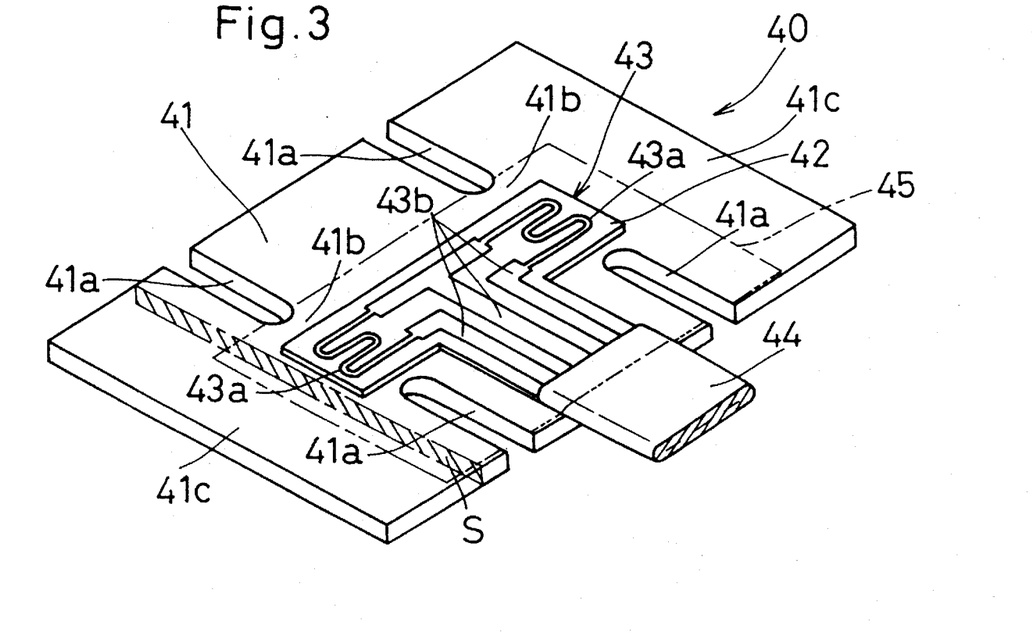
FIG. 3 is a schematic perspective view of a strain sensor used in the load cell of the present invention.

Referring now to FIG. 3 for the detailed discussion of the strain sensor 40, the strain sensor 40 comprises a substrate 41 of a metallic material in the form of a generally rectangular thin plate having its opposite side edge portions formed with respective pairs of notches generally identified by 41a. The notches 41a of each pair are aligned with each other so as to leave between the notches 41a of the respective pair an associated constricted area 41b which serves as a strain generating area where stresses are easy to build up. This strain sensor 40 also comprises a strain detecting unit 43 mounted on the metal substrate 41 through an electric insulator layer 42 so as to extend generally between the constricted or stress generating areas 41a. The strain detecting unit 43 is formed by depositing electro-conductive metal foil in a predetermined pattern on the electric insulator layer 42 by the use of, for example, a circuit printing technique or a lithographic technique and includes a pair of strain detecting resistance elements 43a and electric conductors 43b which connect the strain detecting resistance elements 43a with a flat cable or a flexible ribbon cable 44 having a corresponding number of electric lines connected, or otherwise soldered, with the conductors 43b.

The strain detecting unit 43 is so designed that, when a strain acts on the strain detecting unit 43, electric signals each indicative of a change in resistance of the associated strain detecting resistance elements 43a can be outputted through the flat cable 44. Preferably, the strain detecting unit 43 on the electric insulator layer 42 is protected by a protective overcoat 45 of any suitable electrically insulating material.

So far described, when a load is applied to a scale table as will be described later, the movable rigid body 3 is displaced downwardly relative to the fixed rigid body 2, accompanied by a corresponding downward displacement of the mount 30a of the second intermediate plate member 30A in the movable rigid body 3 relative to the mount 30a of the first intermediate plate member 30B in the fixed rigid body 2. When this downward displacement of the movable rigid body 3 relative to the fixed rigid body 2 takes place, the strain sensor 40 is deformed in a manner generally depicting the shape of a figure "S", as viewed from lateral direction SD, with the consequence that a tension acts on the constricted or strain generating area 41b (FIG. 3) of the metal substrate 41 adjacent the fixed rigid body 2 whereas a compression acts on the strain generating area 41b of the metal substrate 41 adjacent the movable rigid body 3. This deformation of the strain sensor 40 results in respective changes in resistance of the electric resistance elements 43a which are subsequently outputted through a Wheatstone bridge network shown in FIG. 4.

Figure 4:
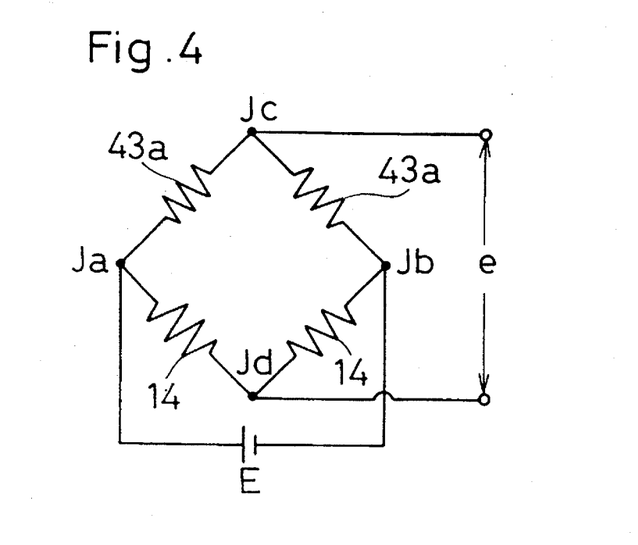
FIG. 4 is a circuit diagram showing a load detecting circuit in which the load sensor is employed.

More specifically, with reference to FIG. 4, the electric resistance elements 43a are connected in series with each other through a junction Jc to form a series circuit which is in turn connected with a series circuit of dummy resistors 14 connected with each other through a junction Jd, thereby to form the Wheatstone bridge network. In this Wheatstone bridge network shown in FIG. 4, a predetermined voltage E is applied between a junction Ja of one of the strain detecting resistance elements 43a with one of the dummy resistors 14 and a junction Jb of the other of the strain detecting resistance elements 43a with the other of the dummy resistors 14, an output voltage e, that is, an electric output signal as a function of the load imposed thereon, can be generated between the junctions Jc and Jd in correspondence with a change in resistance of each of the strain detecting resistance elements 43a. This electric output signal is eventually processed to provide a measurement of the load imposed on the strain inducing unit 1 of the present invention.

The strain sensor 40 shown in FIG. 3 is supported within the rectangular-sectioned hollow by the first and second intermediate plate members 30A and 30B, shown in FIG. 2, with opposite end portions 41c of the metal substrate 41 mounted on and spot-welded to the respective mounts 30a by the use of any suitable welding technique such as, for example, a YAG welding technique or an electron beam welding technique.

Figure 5:
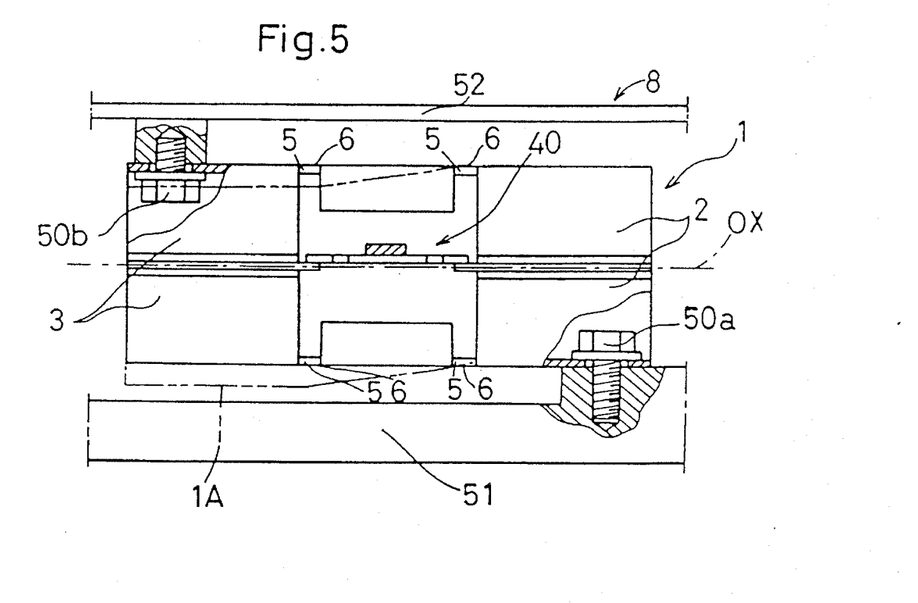
FIG. 5 is a schematic side sectional view showing the load cell employed in a weighing apparatus.

Referring now to FIG. 5, the strain inducing unit 1 in an assembled condition is mounted on a base plate 51, forming a part of an electronic scale, by means of a set bolt 50a passing through the fixed rigid body 2 and fastened to the base plate 51 from above. On the other hand, the strain detecting unit 1 is secured to a scale table 52, also forming another part of the electronic scale, by means of a set bolt 50b passing through the movable rigid body 3 and fastened to the scale table 52 from below. Thus, it will readily be understood that, when an object to be weighed is placed on the scale table 52, the movable rigid body 3 moves downwardly and generally parallel relative to the fixed rigid body 2 as shown by the phantom line 1A, accompanied by a generation of a substantial amount of strain which is detected by the strain sensor 40. In this way, the load imposed on the movable rigid body 3, that is, the weight of the object to be weighed that is placed on the scale table 52, is measured by processing the electric output signal generated from the strain sensor 40.

Preferably, to manufacture the strain sensor 40, a method may be employed which comprises the steps of forming a plurality of strain detecting units 43 on a single metal matrix and then cutting the metal matrix to produce the individual strain detector assemblies 40 each including the metal substrate 40 with the strain detecting unit 43 formed thereon.

This method permits the manufacture of a plurality of the strain sensor 40 using a single metal matrix and is therefore advantageous in terms of productivity.

The strain inducing unit 1 including the upper and lower plate structures 12 and 22 and the intermediate plate structure 30, that is, the first and second intermediate plate members 30A and 30B, is preferably made of stainless steel, but may be made of any known suitable metal such as, for example, aluminum. Similarly, the metal substrate 41 forming a part of the strain sensor 40 is preferably made of the same metal as that used for the strain inducing unit 1, that is, stainless steel, but may be made of any other suitable metal such as, for example, aluminum.

The electric insulator layer 42 forming another part of the strain sensor 40 may be made of any suitable synthetic resin having an electrically insulating property such as, for example, polyimide resin, polyester resin, phenol resin, or epoxy resin.

The strain detecting resistance elements 43a also forming another part of the strain sensor 40 is made of metal such as, for example, tantalum nitride, copper-nickel alloy or nickel-chromium alloy while the conductors 43b are made of metal having a high electro-conductive property such as, for example, aluminum.

The protective overcoat 45 deposited on the electric insulator layer 42 so as to cover the strain sensor 40 is made of any one of synthetic resins such as, for example, solder-resist, butyl rubber and silicon rubber, or a combination of them.

In the strain inducing unit 1 shown in and described with reference to FIGS. 1 to 5, while the strain inducing unit 1 is substantially made of metal, the strain detecting unit 43 of the strain sensor 40 shown in FIG. 3 is formed on the metal substrate 41 which is in turn mounted in the strain inducing unit 1 by the use of the welding technique in the manner as described hereinbefore. The welding job employed to secure the strain sensor 40 to the first and second intermediate plate members 30A and 30B involves an easy mechanical handling and does not require any large-sized workshop such as an vacuum chamber. Accordingly, as compared with the prior art structure in which either a bonding agent or a patterning technique is employed, the mounting of the strain sensor 40 to the strain inducing unit 1 can readily and efficiently be accomplished with high workability, thereby facilitating a production of the load cells. Yet, since the metallic plate 41 has a sufficiently small thickness and also has a cross-sectional surface area S, shown in FIG. 3, which is of a size small enough to avoid the possibility that the amount of strain induced in the strain inducing unit 1 will be adversely affected, the accuracy of the load detection will not be reduced.

In addition, the upper and lower plate structures 12 and 22 have the strain inducing areas 6 between the top walls 10a and 4a in the upper plate structure 12 and between the bottom walls 20a and 4a in the lower plate structure 22, so that the movable rigid body 3 can move downwardly and generally parallel relative to the fixed rigid body 2 according to the load imposed thereon. In addition, the strain inducing unit 1 of the above described construction is of a symmetrical structure with respect to the geometric center point C. Therefore, the strain inducing unit 1 as a whole constitute a Roberval's parallel motion mechanism. With this Roberval's parallel motion mechanism, the strain induced in the strain detecting unit 43 positioned in a region bound by the strain inducing areas 6 is in proportion to the load to be measured and, therefore, a precise and accurate detection of the load can advantageously be accomplished with minimized adverse effect of a moment of the load.

Also, since the metal substrate 41 of the strain sensor 40 is disposed in alignment with the mid-center line OX parallel to the lengthwise direction of the strain inducing unit 1 and is positioned at a location substantially intermediate of the height of the strain inducing unit 1, the extent to which the strain sensor 40 may be adversely affected by the bending moment acting in the strain inducing unit 1 can further be advantageously minimized, resulting in an increase in load detecting accuracy. It is to be noted that, since the metal substrate 41 forming a part of the strain sensor 40 is not a structural element for supporting the applied load, it is possible to employ it in the form of a thin plate member and, also, the metal substrate 41 of the strain sensor 40 can be positioned as close to the mid-center line OX as possible.

Moreover, since the metal substrate forming a part of the strain sensor 40 is in the form of the thin metallic plate having the constricted areas 41b which generate the strain as a result of the stress build-up and the strain detecting unit 43 is positioned at that constricted area 41b, a substantially increased amount of strain acts on the strain detecting unit 43, making it possible to accomplish the precise and accurate detection of the load.

Also, the metal substrate 41 forming a part of the strain sensor 40 is held in contact with the first and second intermediate plate members 30A and 30B merely through the opposite end portions 41c thereof that are welded to the associated mounts 30a of the first and second intermediate members 30A and 30B, and a major portion of said metal substrate 41 being held out of contact from any one of the first and second intermediate plate members 30A and 30B. Therefore, the metal substrate 41 is substantially insensitive to any possible load-induced deformation which would otherwise occur when a large back surface area of the metal substrate 41 opposite to the strain sensor 40 is brought into frictional contact with any one of the intermediate plate members 30A and 30B, thereby making it possible to accomplish a precise and accurate detection of the load.

Considering that the metal substrate 41 on which the strain detecting unit 43 is formed through the electric insulator layer 42 is made of the same metallic material, that is, stainless steel, as that for the strain inducing unit 1, the metallic substrate 41 exhibits the same coefficient of thermal expansion as that exhibited by the strain inducing unit 1 and, therefore, any possible change in amount of strain detected by the strain detecting unit 43 which would occur as a result of a change in ambient temperature regardless of the load-induced strain can be minimized or substantially eliminated, with the strain sensor 40 consequently exhibiting a favorable temperature dependent characteristic.

Furthermore, since the metal substrate 41 has its opposite end portions welded to the first and second intermediate plate members 30A and 30B with the region of the strain detecting unit 43 positioned clear from and intermediate between the first and second plate members 30A and 30B, the strain detecting unit 43 will not be adversely affected by and undesirably deformed by the elevated temperature in the presence of a welding heat generated during the welding job.

The use of the protective overcoat 45 covering the strain detecting unit 43 is effective to avoid any possible reduction in detecting capability of the strain detecting unit 43 which would occur when adversely affected by humidity, thereby ensuring a stable functioning of the strain detecting unit 43 for a prolonged time.

Yet, since the spot-welding technique is employed to secure the metal substrate 41 to the first and second intermediate plate members 30A and 30B, the entire surface area occupied by spot-weld joints between the metal substrate 41 and the first and second intermediate plate members 30A and 30B is much smaller than that which would be occupied when a seam welding is effected. Where the seam welding technique occupying a large welding area is employed to weld the metal substrate 41 to the first and second intermediate plate members 30A and 30B, there is a possibility that a deviation occurring between the metal substrate 41 and any one of the first and second intermediate plate members 30A and 31B when the strain inducing unit 1 undergoes a deformation will not be sufficiently absorbed and a frictional contact between the metal substrate 41 and any one of the first and second intermediate plate members 30A and 30B would hamper a deformation of the strain inducing unit 1 according to the load imposed thereon. The use of the spot-welding technique occupying a small welding area for welding the metal substrate to the first and second intermediate plate members 30A and 30B is effective to avoid such a possibility, making it possible to secure the precise and accurate load detection. It is to be noted that the employment of the YAG welding technique is effective to avoid a stress set-up around each spot-weld joint and, therefore, will not adversely affect the linearity of the strain inducing unit 1.

Also, since welding area of the spot welding is small as compared with the seal welding, internal stresses thereby would occur in the metal substrate 41 is suppressed thereby minimizing an adverse effect of the internal stresses on the deformation of the strain inducing unit 1. In addition, since the YAG welding technique does not result in a build-up of weld strains in the vicinity of welded sites, the linearity of deformation of the strain inducing unit 1 will not be deteriorated.

Furthermore, all of the upper plate structure 12, the lower plate structure 22 and the first and second intermediate plate members 30A and 30B are made of metal by the use of a press work thereby to constitute the strain inducing unit 1. Therefore, as compared with the prior art, the present invention does not require the use of any die casting and a subsequent machining both employed in the practice of the prior art to form the strain inducing unit, and accordingly, the present invention is effective to simplify the process of making the strain inducing unit thereby to improve the productivity.

Moreover, since the strain inducing unit 1 as a whole has a symmetrical profile with respect to the geometric center point C, both of the upper plate structure 12 and the lower plate structure 22, which form the respective upper and lower portions of the fixed and movable rigid bodies 2 and 3, can be manufactured by the use of a single and the same die and punch and, therefore, the present invention is effective to enhance the production of the strain inducing unit 1 and, hence, the load cell using the same, accompanied by a reduction in the manufacturing cost of the load cell.

Figure 6:
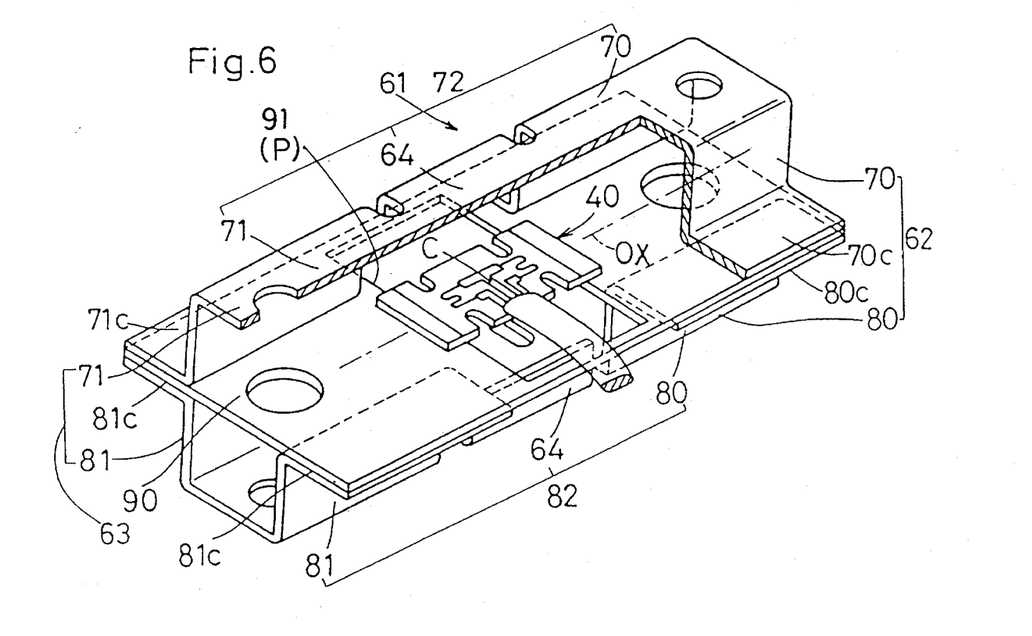
FIG. 6 is a schematic perspective view of the load cell according to a second preferred embodiment of the present invention.

FIG. 6 illustrates the strain inducing unit according to a second preferred embodiment of the present invention.

Referring now to FIG. 6, the strain inducing unit according to this embodiment is generally indicated by 61 and has fixed and movable rigid bodies 62 and 63 occupying respective opposite ends of the strain inducing unit 61. This strain inducing unit 61 comprises generally elongated upper and lower plate structures 72 and 82 of substantially identical construction with the upper plate structure 72 positioned above the lower plate structure 82 so as to define a generally rectangular-sectioned hollow therebetween, a generally rectangular intermediate plate structure having the cut space defined therein and having its opposite end portions sandwiched at their side edges between the upper and lower plate structures 72 and 82, and a strain sensor 40 positioned within the rectangular-sectioned hollow and supported by the intermediate plate structure in a manner as will be described later.

The upper plate structure 62 is of one-piece construction including a pair of rigid body forming regions 70 and 71 opposite to each other and connected together by means of an upper beam 64, said rigid body forming regions 70 and 71 constituting respective upper portions of the fixed and movable rigid bodies 62 and 63. Similarly, the lower plate structure 82 is of one-piece construction including a pair of rigid body forming regions 80 and 81 opposite to each other and connected together by means of a lower beam 64, said rigid body forming regions 80 and 81 constituting respective lower portions of the fixed and movable rigid bodies 62 and 63. It is to be noted that the strain inducing unit 61 having the rectangular-sectioned hollow defined between the upper and lower plate structures 72 and 82 is symmetric in shape with respect to the geometric center point C of the strain inducing unit 61.

Figure 7:
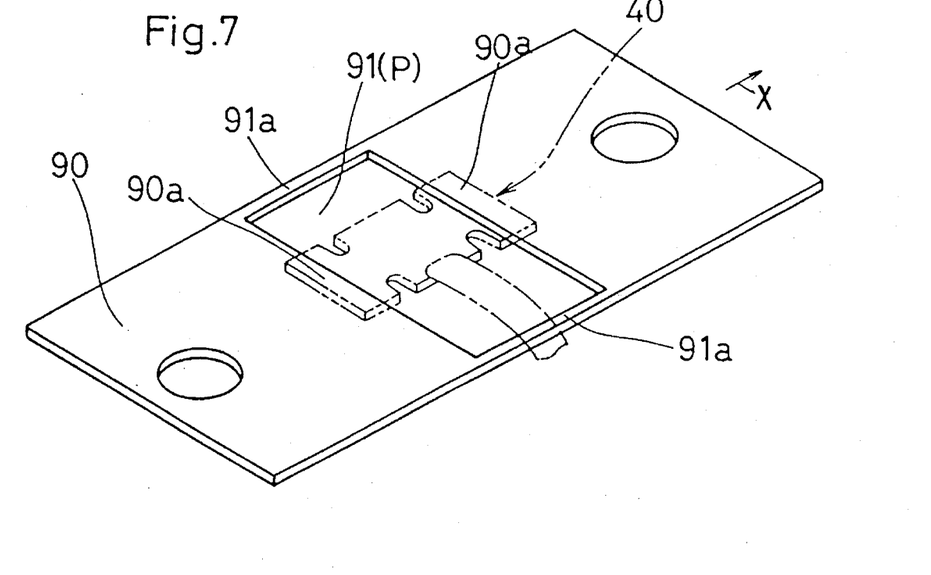
FIG. 7 is a schematic perspective view of an intermediate plate employed in the load cell shown in FIG. 6.

The structure so far described is substantially similar to that described in connection with the first preferred embodiment of the present invention except that, instead of the use of the two intermediate plate members 30A and 30B in the first embodiment, the intermediate plate structure is in the form of a single intermediate plate member 90 having a generally rectangular opening 91 defined therein, which opening 91 in the embodiment of FIG. 6 forms the cut space P in the intermediate plate structure. More specifically, as best shown in FIG. 7, the intermediate plate member 90 shown therein has an intermediate portion blanked off to define the generally rectangular opening 91 having its longitudinal axis oriented perpendicular to the longitudinal axis X of the intermediate plate member 90 while leaving a pair of opposite connecting strips 91a. Opposite peripheral lip regions of the intermediate plate member 90 defining the opening 91, which lie parallel to the respective ends of the intermediate plate member 90, form respective mounts 90a to which the opposite ends of the strain sensor 40 of the structure described in connection with the previous embodiment of the present invention are welded to permit the strain sensor 40 to be supported by the intermediate plate member 90 while bridging over the opening 91.

To complete the strain inducing unit 61, the intermediate plate member 90 is sandwiched between the upper and lower plate structures 72 and 82 with flanges 70c and 71c of the upper plate structure 62 welded together with the associated flanges 80c and 81c of the lower plate structure 82. At this time, opposite side edge portions of the intermediate plate member 90 are sandwiched between the flanges 70c and 71c of the upper plate structure 72 and the flanges 80c and 81c of the lower plate structure 82 and are then welded thereto. For welding the upper and lower plate structures 72 and 82 together with the intermediate plate member 90 intervening therebetween, any suitable welding method may be employed such as, for example, a spot welding technique. Prior to the welding being effected to the flanges 70c, 71c and 80c, 81c of the upper and lower plate structures 72 and 82, the strain sensor 40 is secured at its opposite ends to the respective mounts 90a of the intermediate plate member 90 so as to traverse the opening 91 defined in the intermediate plate member 90.

In the construction shown in and described with reference to FIGS. 6 and 7, the upper plate structure 72, the lower plate structure 82 and the intermediate plate member 90, all made of metal by the use of a press work, constitute the strain inducing unit 1 together with the strain sensor 40. Therefore, as is the case with the previously described embodiment of the present invention, not only can the productivity of the load cell be increased, but also both of the upper plate structure 72 and the lower plate structure 82, which form the respective upper and lower portions of the fixed and movable rigid bodies 62 and 63, can be manufactured by the use of a single and the same die and punch, thereby enhancing the production of the strain inducing unit 61 and, hence, the load cell using the same, accompanied by a reduction in the manufacturing cost of the load cell.

Also, in the second preferred embodiment of the present invention, the strain inducing unit 61 as a whole has a symmetrical profile with respect to the geometric center point C thereby to form the Roberval's parallel motion mechanism, and the strain sensor 40 is disposed in alignment with the mid-center line OX extending longitudinally of the strain inducing unit 1 while positioned substantially intermediate of the height of the strain inducing unit 1. Therefore, in the event that the movable rigid body 63 in the load cell is loaded, the strain in a quantity proportional to the load imposed on the movable rigid body 63 is induced in the strain sensor 40 supported by the intermediate plate member 90 at the mounts 90a so as to traverse the opening 91 defined therein, thereby to accomplish a precise and accurate detection of the load without being adversely affected by a moment of the load, in a manner similar to the first preferred embodiment of the present invention.

Specifically according to the second preferred embodiment of the present invention, the intermediate plate member 90 is formed by preparing a single metal plate and perforating an intermediate portion thereof to define the rectangular opening 91 for accommodating the strain sensor 40 that is subsequently mounted therein with its opposite ends secured to the mounts 90a while bridging over the opening 90. Therefore, while in the construction according to the previous embodiment of the present invention care is required to avoid any deviation in relative positions among the strain sensor 40 and the first and second intermediate plate member 30A and 30B, the second preferred embodiment of the present invention does not require such a precise positioning. Since the intermediate plate member 90 is in the form of the single metal plate having the opening 91 defined therein, the second preferred embodiment of the present invention suffices to mount the strain sensor 40 in position and, therefore, the strain sensor 40 can easily be positioned relative to the single intermediate plate member 90, accompanied by an increased ease to assembly the strain inducing element 61 with an improved productivity.

According to the previously discussed first preferred embodiment of the present invention, if the strain sensor 40 is mounted on the first and second intermediate plate members 30A and 30B improperly, that is, in a deviated fashion, and the resultant assembly is subsequently positioned between the upper and lower plate structures 12 and 22 to complete the strain inducing element 61, and considering that the position where the first and second plate members 30A and 30b are mounted is in practice restricted by the upper and lower plate structures 12 and 22, an unnecessary initial load resulting from the deviation in position of the strain sensor 40 relative to one or both of the intermediate plate members 30A and 30B will act on the strain sensor 40. Once this occurs, the strain sensor 40 may be damaged or will give rise to an incorrect measurement accompanied by a reduction in load detecting accuracy. This possibility does not occur according to the second preferred embodiment of the present invention shown in and described with particular reference to FIGS. 6 and 7.

More specifically, in the practice of the second embodiment of the present invention, since the strain sensor 40 is mounted on the single intermediate plate member 90 so as to bridge over the opening 91 defined therein and the resultant assembly is subsequently mounted between the upper and lower plate structures 72 and 82, no unnecessary initial load act on the strain sensor 40, resulting not only in an increase in durability of the strain sensor 40 and, hence, that of the strain inducing unit 61, but also in an increased load detecting accuracy.

It is to be noted that, if in the practice of the second embodiment of the present invention the size of each of the connecting strips 91a connecting the opposite end portions of the plate member 90 is properly chosen, not only can the load imposed on the strain sensor 40 be controlled, but also a thermal conductivity of the strain sensor 40 and the strain inducing unit 61 as a whole can be controlled, thereby permitting the strain inducing unit 61 to exhibit a thermal stability against a change in temperature.

Figure 8:
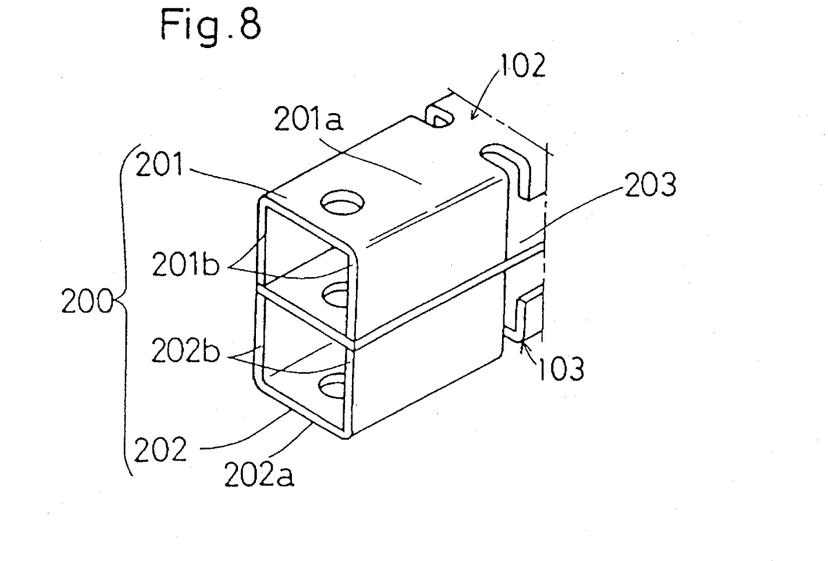
FIG. 8 is a fragmentary perspective view showing a modified form of one of fixed and movable rigid bodies forming respective parts of the load cell of the present invention.

In any one of the foregoing embodiments of the present invention, each of the upper and lower plate structures 12 and 22 or 72 and 82 has been shown and described as having flanges for connecting the upper and lower plate structures together with the associated plate member or members sandwiched therebetween. However, each end portion of each of the upper and lower plate structures and the associated intermediate plate member may be modified as shown in FIG. 8. In the modification of FIG. 8, no flanges such as employed in any one of the first and second embodiments of the present invention is employed.

Referring now to FIG. 8 in which only one end portion of each of the upper and lower plate structures 102 and 103 which forms the fixed or movable rigid bodies 200 is shown for the sake of brevity, an upper end portion of each of the fixed and movable rigid bodies 200 and 203 is formed by a corresponding upper rigid body forming region 201 having a top wall 201a and a pair of opposite side walls 201b substantially perpendicular to the top wall 201a and, similarly, a lower portion of each of the fixed and movable rigid bodies 200 is formed by a corresponding lower rigid body forming region 202 having a bottom wall 202a and a pair of opposite side walls 202b substantially perpendicular to the bottom wall 202a. An intermediate plate 203 has a width corresponding to the span between the side walls 201b of each of the upper and lower rigid body forming regions 201 and 202, having its side edges sandwiched and welded in position between the side walls 201b and 202b.

According to the modification shown in and described with reference to FIG. 8, since no flange is employed in each of the upper and lower plate structures, it is evident that the strain inducing unit 101 has a light-weight feature.

Figure 9:
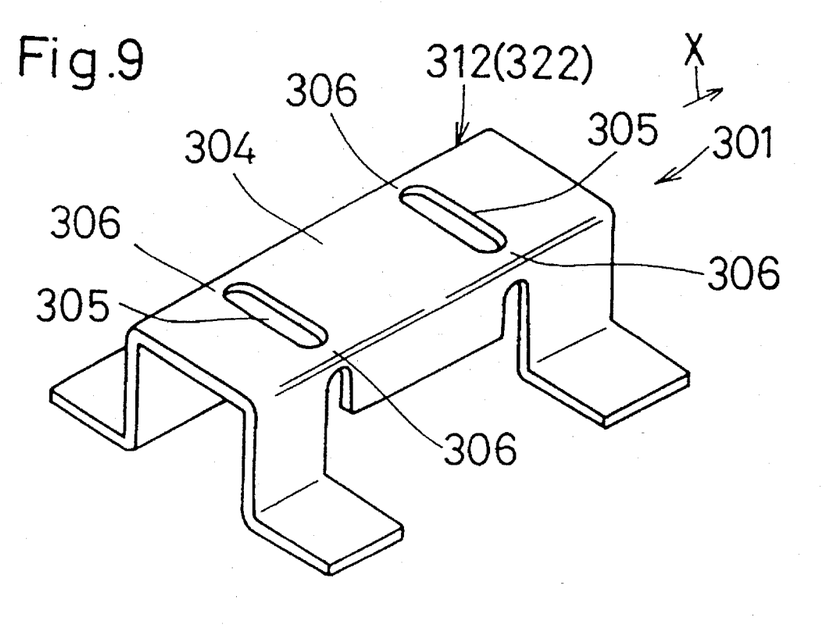
FIG. 9 is a fragmentary perspective view showing a modified form of one of beam members forming respective parts of the load cell of the present invention.

Also, in any one of the foregoing embodiments of the present invention, the pairs of the notches have been described as formed in each of the upper and lower plate structures to define the two constricted areas (strain generating areas) of reduced width. However, in a further modification shown in FIG. 9, each of the upper and lower plate structures 312 and 322 of the strain inducing unit 301 (only the upper one 312 is shown in FIG. 9) has a beam portion 304 in which a pair of slots 305, each having a pair of rounded ends opposite to each other, are defined so as to extend perpendicular to the longitudinal axis X of the plate structure, thereby leaving the pairs of the constricted areas (strain generating areas) 306, one pair on each side thereof.

Figure 10:
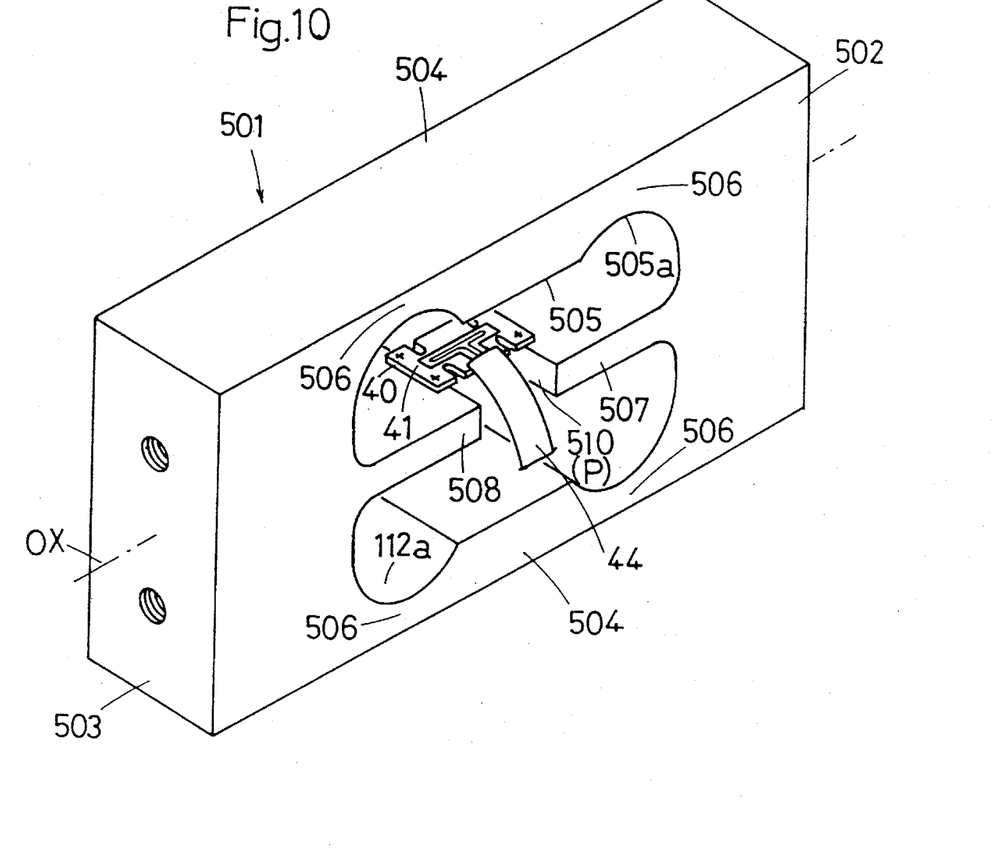
FIG. 10 is a schematic perspective view of the load cell according to a third preferred embodiment of the present invention.

FIG. 10 illustrates a strain inducing unit 501 according to a third preferred embodiment of the present invention. In this embodiment, to complete the load cell, this strain inducing unit 501 employs the strain sensor 40 of the construction shown in FIG. 3, which sensor 40 is positioned at a location substantially intermediate of the height of the strain inducing unit 501. More specifically, the strain inducing unit 501 is formed of metal into a generally rectangular cubic body having a cave 505 defined therein so as to leave fixed and movable rigid bodies 502 and 503 at opposite ends thereof, respectively, and also as to leave top and bottom beam portions 504 at opposite sides thereof, respectively, said top and bottom beam portions 504 connecting the fixed and movable rigid bodies 502 and 503 together. At the same time, opposite portions of the cave 505 adjacent the fixed and movable rigid bodies 502 and 503 are enlarged in shape to represent a generally oval shape so that opposite ends of each of the beam portions 504, which ends connect the respective beam portion 504 with the fixed and movable rigid bodies 502 and 503, respectively, are reduced in thickness so as to define associated thin-walled, strain generating areas generally identified by 506, thereby to allow the strain inducing unit 501 to represent the Roberval's parallel motion mechanism.

To support the strain sensor 40, the strain inducing unit 501 has a pair of plate-like wings (intermediate members) 507 and 508 integral therewith for securement of the strain sensor 40. The plate-like wings 507 and 508 is positioned between the upper and lower beams 504 and protrude inwardly of the cave 505 in alignment with the longitudinal axis of the strain inducing unit 501 in respective directions close towards each other so as to leave the cut space P, i.e., a gap or mounting space 510, between the respective free ends of the plate-like wings 507 and 508. As is the case with any one of the first and second embodiments of the present invention, the strain sensor 40 is mounted so as to straddle the mounting space 510 between the plate-like wings 507 and 508 with the opposite ends of the metal substrate 41 welded to the free ends of the plate-like wings 507 and 508, respectively, while aligned with the mid-center line OX parallel to the longitudinal axis of the strain inducing unit 501.

In this embodiment of FIG. 10, the strain inducing unit 501 is of one-piece construction in which the movable and fixed rigid bodies 502 and 503, the top and bottom beam portions 504 and the plate-like wings 507 and 508 are integrated together with the cut space P constituted by the gap 510.

Figure 11:
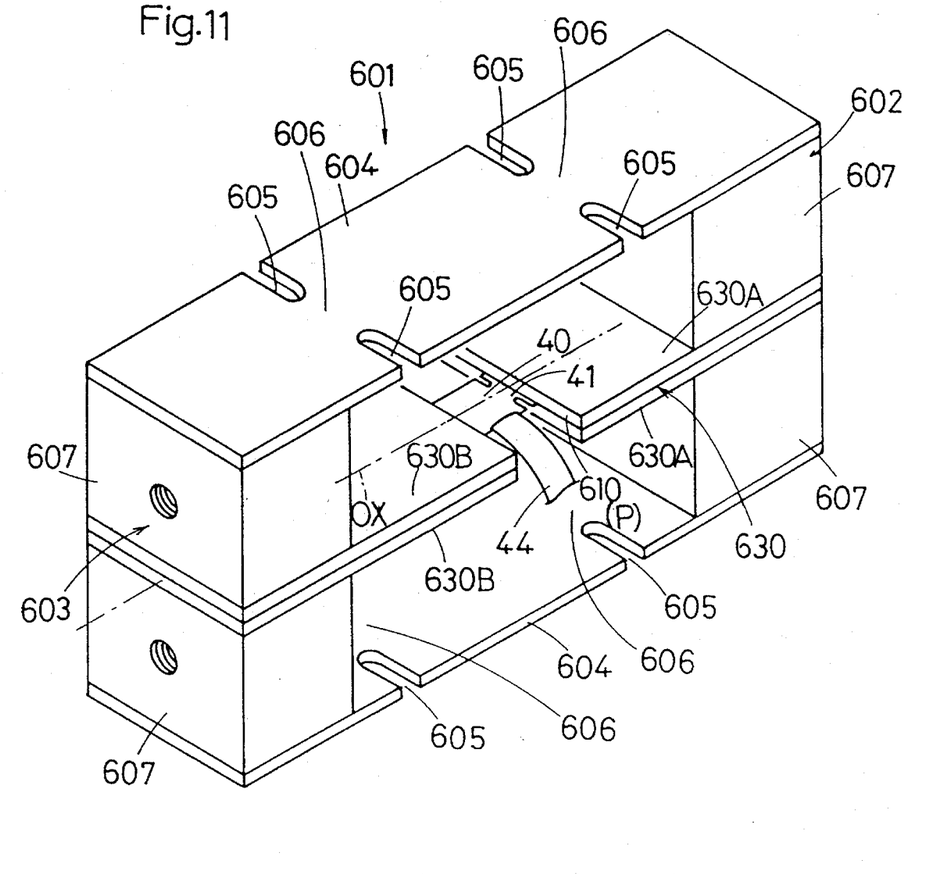
FIG. 11 is a schematic perspective view of the load cell according to a fourth preferred embodiment of the present invention.

FIGS. 11 illustrates a fourth preferred embodiment of the present invention in which the strain inducing unit of a different structure is employed.

According to the fourth preferred embodiment of the present invention shown in FIG. 11, the strain inducing unit 601 shown therein is of a construction wherein the intermediate plate structure 630 having the cut space P is positioned between the upper and lower beam plates 604 each having a pair of notches 605 defined on each side thereof and wherein the beam plates 604 and the intermediate plate structure 630 are connected together by means of a pair of connecting blocks 607 occupying respective positions corresponding to fixed and movable rigid bodies 602 and 603.

The intermediate plate structure 630 employed in the strain inducing unit 601 is comprised of a double walled structure including first and second intermediate plates 603A and 603B which are divided into two plate segments by means of a generally rectangular gap 610 defined therebetween and constituting the cut space P in the intermediate plate structure.

The strain sensor 40 is mounted so as to straddle the gap 610 with the opposite ends of the metal substrate 41 spot-welded to the plate segments of the respective first and second intermediate plates 603A and 603B while sandwiched between the first and second intermediate plate members 603A and 603B, respectively. The strain sensor 40 so supported is aligned with the mid-center line OX parallel to the longitudinal axis of the strain inducing unit 601 and positioned at a location exactly intermediate of the height of the strain inducing unit 601. The paired notches 605 in each of the upper and lower beam plates 604 define a respective constricted or strain inducing area 606 therebetween.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. For example, although the strain sensor employed in any one of the foregoing embodiments of the present has been of the type having the metal substrate and the resistance elements formed on the metal substrate through the insulating layer by the use of the patterning technique, it may comprise a metal substrate having generally interdigital transducers deposited on a thin-film layer having a piezoelectric property. Where this alternative strain sensor is employed, the resonance frequency of surface acoustic waves propagating in portions of the piezoelectric thin-film layers among the interdigital transducers varies as a function of the amount of strain induced in the metal substrate and, therefore, the detection of a change in resonance frequency in time axis effectively provides an indication of the amount of the strain actually induced in the strain inducing unit.

Accordingly, such changes and modifications are, unless they depart from the scope of the present invention as delivered from the claims annexed hereto, to be construed as included therein.

What is claimed is:

1. A load cell for use in detecting a load imposed thereon, said load cell comprising:

a strain inducing means having a longitudinal axis and including a strain generating area for generating a strain as a function of the load, said strain inducing means comprising a fixed rigid body connectable to a base; a movable rigid body spaced apart from the fixed rigid body in a direction parallel to the longitudinal axis of the strain inducing means and having provisions to receive the load; first and second beams spaced apart from each other in a direction perpendicular to the longitudinal axis of the strain inducing means and connecting the fixed rigid body and the movable rigid body together; and an intermediate plate structure fixed to the fixed rigid body and the movable rigid body and positioned intermediate between the first and second beams, said intermediate plate structure having a cut space defined therein at a location intermediate between the fixed rigid body and the movable rigid body;

said strain inducing means being of a symmetrical profile with respect to a geometric center point of the load cell and having a hollow defined therein and delimited by the fixed rigid body, the movable rigid body, the first and second beams and the intermediate plate structure; and a strain sensor including a substrate having a pair of the strain generating areas positioned apart from each other in the longitudinal axis of the strain inducing means for facilitating stress build-up on said substrate, and a strain detecting element formed on the strain generating areas of the substrate, said substrate disposed on a horizontal plane and attached to said intermediate plate structure within said hollow so as to straddle said cut space, and positioned substantially in alignment with a mid-center line extending past the geometric center point and parallel to the longitudinal axis of the strain inducing means.

2. The load cell as claimed in claim 1, wherein said intermediate plate structure comprises a first intermediate plate member secured rigidly to the fixed rigid body and a second intermediate plate member secured rigidly to the movable rigid body, said cut space being a gap formed between the first and second intermediate plate members.

3. The load cell as claimed in claim 1, wherein said intermediate plate structure comprises a single intermediate plate member, said cut space being an opening defined in the intermediate plate member at a location intermediate of the length of the intermediate plate member.

4. The load cell as claimed in claim 1, wherein both of said strain inducing means and said substrate are made of metallic material and wherein said substrate has opposite ends welded to the strain inducing means.

5. The load cell as claimed in claim 1, wherein said substrate has opposite portions clear from a region where the strain sensor is formed, said substrate being supported by the strain inducing means with said portions thereof welded thereto.

6. The load cell as claimed in claim 1, wherein said strain inducing means and said substrate are made of identical metallic material.

7. The load cell as claimed in claim 1, wherein said strain inducing means comprises generally elongated first and second structures with the first structure positioned above the second structure so as to represent the symmetrical profile with respect to the geometric center point, said intermediate plate structure being sandwiched between the first and second structures, said first structure including an upper half of the fixed rigid body, an upper half of the movable rigid body and the first beam while said second structure includes a lower half of the fixed rigid body, a lower half of the movable rigid body and the second beam.

8. The load cell as claimed in claim 7, wherein each of said first and second structures and the intermediate plate structure is formed by the use of a metal plate.

9. A weighing apparatus comprising a load cell and a scale table, said load cell being operatively coupled with said scale table to detect a load applied to the scale table, said load cell comprising:

a strain inducing means having a longitudinal axis and including a strain generating area for generating a strain as a function of the load, said strain inducing means comprising a fixed rigid body adapted to be connected to a base; a movable rigid body spaced apart from the fixed rigid body in a direction parallel to the longitudinal axis of the strain inducing means and adapted to receive the load through said scale table; first and second beams spaced apart from each other in a direction perpendicular to the longitudinal axis of the strain inducing means and connecting the fixed rigid body and the movable rigid body together; and an intermediate plate structure fixed to the fixed rigid body and the movable rigid body and positioned intermediate between the first and second beams, said intermediate plate structure having a cut space defined therein at a location intermediate between the fixed rigid body and the movable rigid body;

said strain inducing means being of a symmetrical profile with respect to a geometric center point of the load cell and having a hollow defined therein and delimited by the fixed rigid body, the movable rigid body, the first and second beams and the intermediate plate structure; and a strain sensor including a substrate having a pair of the strain generating areas positioned apart from each other in the longitudinal axis of the strain inducing means for facilitating stress build-up on said substrate and a strain detecting element formed on the strain generating areas of the substrate, said substrate disposed on a horizontal plane and attached to said intermediate plate structure within said hollow so as to straddle said cut space, and positioned substantially in alignment with a mid-center line extending past the geometric center point and parallel to the longitudinal axis of the strain inducing means.

* * * * *